US007445064B2

(12) United States Patent
Kim

(10) Patent No.: US 7,445,064 B2
(45) Date of Patent: Nov. 4, 2008

(54) VEHICLE USING WIND FORCE

(75) Inventor: Kwang Sik Kim, 9-20, Dongja-dong, Yong San-gu, 140-170 Seoul (KR)

(73) Assignees: Jay Eung Jung Kim, Marina, CA (US); Kwang Sik Kim, Seoul (KR); Eung Ho Kim, Marina, CA (US)

( * ) Notice: Subject to any disclaimer, the term of this patent is extended or adjusted under 35 U.S.C. 154(b) by 469 days.

(21) Appl. No.: 10/551,782

(22) PCT Filed: Apr. 7, 2004

(86) PCT No.: PCT/KR2004/000811

§ 371 (c)(1),
(2), (4) Date: Jan. 20, 2006

(87) PCT Pub. No.: WO2004/090328

PCT Pub. Date: Oct. 12, 2004

(65) Prior Publication Data

US 2006/0113118 A1 Jun. 1, 2006

(30) Foreign Application Priority Data

Apr. 7, 2003 (JP) .................. 10-2003-0021586
Apr. 7, 2004 (JP) .................. 20-2004-0009502

(51) Int. Cl.
*B60K 9/00* (2006.01)
(52) U.S. Cl. ....................... 180/2.2; 180/65.3
(58) Field of Classification Search .......... 180/2.1, 180/2.2, 903, 65.1, 65.3; 290/44, 55
See application file for complete search history.

(56) References Cited

U.S. PATENT DOCUMENTS

| 3,713,503 | A | * | 1/1973  | Haan ............................ 180/2.2 |
| 4,012,163 | A | * | 3/1977  | Baumgartner et al. .... 415/208.3 |
| 4,632,205 | A | * | 12/1986 | Lewis ........................... 180/165 |
| 5,141,173 | A | * | 8/1992  | Lay ................................. 244/2 |
| 5,287,004 | A | * | 2/1994  | Finley ........................... 290/55 |
| 5,844,324 | A | * | 12/1998 | Spriggle ....................... 290/55 |

(Continued)

FOREIGN PATENT DOCUMENTS

JP       9 9658        1/1997

(Continued)

*Primary Examiner*—Christopher Ellis
*Assistant Examiner*—Bridget Avery
(74) *Attorney, Agent, or Firm*—IPLA P.A.; James E. Bame

(57) ABSTRACT

Disclosed is a vehicle using wind force. An object of the present invention is to provide a wind force power system driven by wind is provided within a hood panel of the vehicle, whereby the vehicle continuously charge a battery with electricity while being stopped or driving. The vehicle using wind force includes a wind force power system, the Power system comprising a ventilator that is rotated by the wind flowing along the roof panel in the rear of the vehicle, a shaft connected to the ventilator, a rotary gear connected to the shaft, a follower gear engaged with the rotary gear, and an electric generator for generating electricity as the follower gear rotates, wherein the electric generator of the wind force power system is electrically connected to the battery and the battery is electrically connected to the driving motor.

5 Claims, 4 Drawing Sheets

U.S. PATENT DOCUMENTS

| | | |
|---|---|---|
| 5,986,429 A | 11/1999 | Mula, Jr. |
| 6,373,145 B1 * | 4/2002 | Hamrick ................ 290/44 |
| 6,520,564 B1 * | 2/2003 | Liang ................ 296/180.5 |
| 7,215,037 B2 * | 5/2007 | Scalzi ................ 290/55 |

FOREIGN PATENT DOCUMENTS

| | | |
|---|---|---|
| JP | 10 318121 | 12/1998 |
| JP | 2001 132617 | 5/2001 |
| KR | 1989 0012819 | 9/1989 |
| KR | 20 0182228 | 3/2000 |
| KR | 20 0189995 | 5/2000 |

* cited by examiner

VEHICLE USING WIND FORCE

TECHNICAL FIELD

The present invention relates to a vehicle using wind force. More particularly, the present invention relates to a vehicle using wind force in which a wind force isolated power system driven by wind is provided in a trunk lead at the rear of the vehicle and a hood panel at the front of the vehicle, respectively, whereby the vehicle continuously generates electricity while being stopped or driving, thus charging a battery.

BACKGROUND ART

As noted well, because of convenience and rapidity of long distance traveling, the number of vehicle holdings every home is increased. In Korea, the number of vehicle holdings exceeds 10 millions. On average, each home holds one or more vehicles.

As the number of vehicles is increased, the amount of consumption of fuels such as gasoline, light oil, LPG or the like is further increased. Such petroleum fuels have the estimated amount of deposits. It is expected that those fuels will be depleted in the near future.

Accordingly, as time goes, the price of the petroleum fuels soars. Further, smoke, etc. generated when the petroleum fuels are combusted becomes a factor that causes severe environmental contamination.

In view of those problems, vehicles using electricity or solar heat have recently been developed. The vehicle using electricity cannot be charged while being driven and requires a long time to charge electricity.

Furthermore, in order to install an electricity charging station, an expensive electric power cable has to be extended to the electricity charging station. In this case, not only its installation cost is very high, but also the facilities are very dangerous. In this connection, the electric vehicle is applied to only leisure or carts for a golf course, but is not commercialized.

DISCLOSURE OF INVENTION

Accordingly, the present invention has been made in view of the above problems, and it is an object of the present invention to provide a vehicle using wind force in which a wind force isolated power system driven by wind is provided in a trunk lead at the rear of the vehicle and a hood panel at the front of the vehicle, respectively, whereby the vehicle continuously charge a battery with electricity while being stopped or driving.

In order to accomplish the above objects, according to an aspect of the present invention, there is provided a vehicle using wind force having a wind force power system, wherein the vehicle includes an battery charged with electricity, and a driving motor electrically connected to a battery and connected to driving wheels, for transferring rotary force to the driving wheels, the wind force power system, comprising: a ventilator formed in a trunk lead in the rear of the vehicle, wherein the ventilator is rotated by the wind that flows along a roof panel; a shaft connected to the ventilator and fixed to the body of the vehicle, wherein the shaft is supported by a support in which permanent magnets are formed; a disk type rotary gear coupled to the bottom of the shaft; a disk type plate disposed opposite to the support on the shaft between the ventilator and the disk type rotary gear coupled to the shaft, wherein the disk type plate has the permanent magnets at the bottom in the same polarity as the permanent magnet formed in the opposite side of the support and is levitated by repulsion force; a follower gear engaged with the disk type rotary gear; and an electric generator for generating electricity as the follower gear rotates, wherein the electric generator of the wind force power system is electrically connected to the battery and the battery is electrically connected to the driving motor.

Further, the permanent magnets formed in the top girth element of the support that supports the shaft of the wind force power system, and the permanent magnets formed in the bottom girth element of the disk type plate coupled to the shaft are disposed opposite to each other, and the permanent magnets are disposed with inclination in the rotary direction of the shaft are disposed to face one another in the same polarities so that they can relatively move, whereby the members connected to the shaft have the rotary force by means of the repulsion force of the permanent magnets.

Meanwhile, the disk type rotary gear of the wind force power system is connected to a motor, wherein the motor is disposed on the top of the roof panel of the vehicle or at a predetermined location of the top of the roof panel, electrically connected to the charger charged with electricity through a solar heat charging plate supported by the support bar and driven by solar heat, whereby the motor helps the disk type rotary gear to rotate, increasing the amount of electric power of the electric generator.

Also, the vehicle using wind force further comprises one or more ventilation tubes for ventilating the wind from the front of the vehicle to the rear of the vehicle, wherein the ventilation tubes are fixed to the body of the vehicle, wherein wind-swept place projections are formed on the disk type plate coupled to the shaft in equal distance in all directions, an outlet of each of the ventilation tubes is curved in the rotary direction of the shaft, whereby the outlet is oriented toward the wind-swept place projection and a disk type rotary gear fixed to the bottom of the shaft is made to rotate, increasing the amount of electric power of an electric generator.

Accordingly, in the vehicle using wind force, the rotary shaft rotatably fixed to the trunk lead in the rear of the vehicle and the members connected thereto can be in a no-load state by means of the maglev of the permanent magnets. Thus, as the rotary and members can smoothly rotate in a breeze, the vehicle can generate electricity. Furthermore, the rotary shaft can be more smoothly rotated by means of a streamline shape that the height of the rear of the vehicle is lower than that of the front of the vehicle, the rotary force of a small-sized motor powered by solar energy, the rotary force depending on the relative motion between the permanent magnets, and transfer of the wind of the ventilation tube that is penetrated from the front of the vehicle to the rear of the vehicle. Thereby, the amount of electricity greater than needed to drive the vehicle can be generated.

Therefore, the vehicle can be consistently charged without additional charging operation, a battery charging place needs not to be installed, and a counterpart electric vehicle that cannot be expected in a known electric vehicle can be manufactured.

According to another aspect of the present invention, the wind force power system is additionally disposed at a trunk panel in the rear of the vehicle, the wind force power system, comprising: an intercooler disposed in the hood panel in the front of the vehicle; a ventilator that is rotated by the wind introduced through the intercooler, wherein the ventilator is disposed within the hood panel; a shaft connected to the ventilator and fixed to the body of the vehicle, wherein the shaft is supported by a support in which permanent magnets are formed; a disk type rotary gear coupled to the bottom of the shaft; a disk type plate disposed opposite to the support on the shaft between the ventilator and the disk type rotary gear coupled to the shaft, wherein the disk type plate has the permanent magnets at the bottom in the same polarity as the permanent magnet formed in the opposite side of the support and is levitated by repulsion force; a follower gear engaged with the disk type rotary gear; and an electric generator for generating electricity as the follower gear rotates.

BRIEF DESCRIPTION OF DRAWINGS

Further objects and advantages of the invention can be more fully understood from the following detailed description taken in conjunction with the accompanying drawings in which.

BEST MODE FOR CARRYING OUT THE INVENTION

The present invention will now be described in detail in connection with preferred embodiments with reference to the accompanying drawings.

FIRST EMBODIMENT

Figure 1:
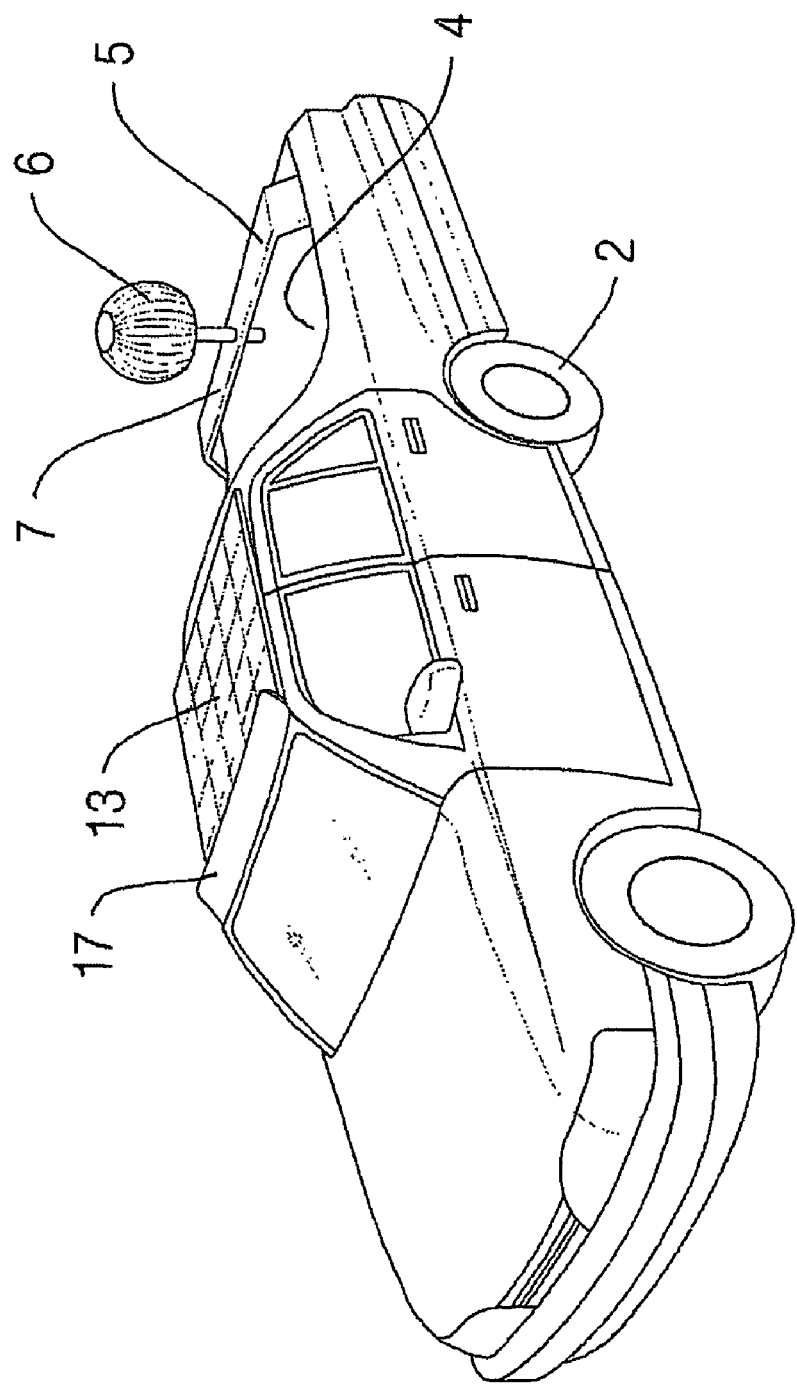
FIG. 1 is a perspective view illustrating a vehicle using wind force according to the present invention.
Figure 2:
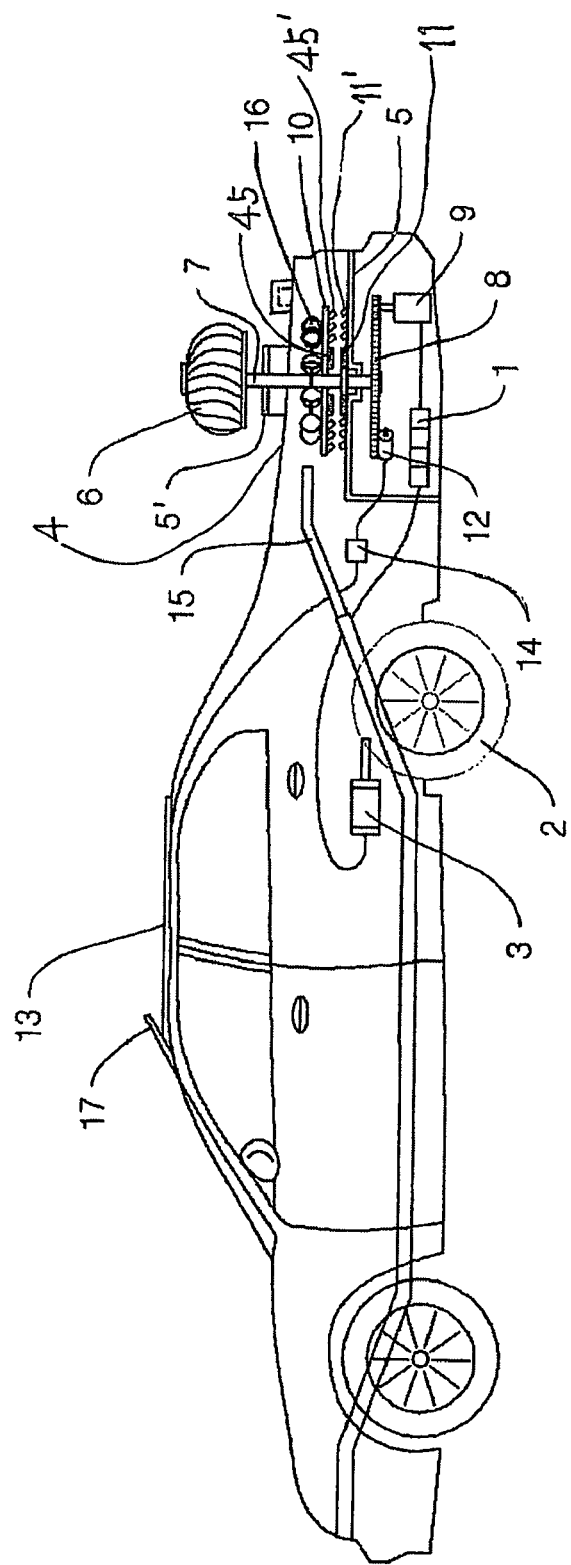
FIG. 2 schematically shows the structure of the vehicle using wind force shown in FIG. 1.

Referring to FIG. 1 and FIG. 2, a driving motor 3 is electrically connected to a battery 1 and connected to a driving wheel 2. The driving motor 3 transfers rotary force of the driving wheel 2 to the driving wheel 2. In this case, the rear of a vehicle provided with the driving motor 3 is formed lower than its front in a streamline shape so that wind can move toward the rear of the vehicle on wind.

Supports 5 and 5' are each disposed in and out of a trunk lead 4 of the vehicle. A spherical ventilator 6 is formed in the outside support 5', so that ventilator 6 is rotated by wind. A disk type plate type gear 8 is fixed to the bottom of a shaft 7 connected to the ventilator 6. In the above, the gear 8 is engaged with the shaft of an electric generator 9, so that electricity generated therefrom is charged to the battery 1. A disk type plate 10 is fixed on the shaft 7. Pairs of permanent magnets 11, 11', 45 and 45' are each formed on the opposite side of each of the inside support 5 and the disk type plate 10 so that they face the same polarity, whereby the shaft 7 and members 6 and 16 connected thereto.

A small-sized motor 12 for transferring the rotary force is closely adhered on the bottom of the disk type plate type gear 8, so that it helps the rotary operation of the shaft 7. A charging plate 13 for charging sun's ray is disposed on the roof of the vehicle. Thus, electric power generated from the charging plate 13 is automatically charged to a charger 14 for driving a small-sized motor.

In addition, at least one ventilation tube 15 for ventilating wind from the front of the vehicle to the rear of the vehicle is disposed in the body of the vehicle. Wind-swept place projections 16 are formed on the disk type plate 10 coupled to the shaft 7 in all directions and equal distance. Thus, an exhaustion portion of the ventilation tube 15 is curved in a rotary direction of the rotary shaft 7 and is located toward the wind-swept place projection 16. The permanent magnets 11' and 45' are each disposed in the girth element of the opposite side of the top of the inside support 5 and the bottom of the disk type plate 10 with a slant in the rotary direction of the rotary shaft 7. In this case, the permanent magnets 11' and 45' are disposed to face the same polarity so the they can relatively move, whereby members connected to the rotary shaft 7 can rotate by means of the magnetic force.

In the above, the spherical ventilator 6 has a common ventilator that can amplify introduced wind without addition power and can be strongly rotated in one direction. The wind-swept place projection 16 formed on the disk type plate 10 is formed in equal direction in all directions and receives air from an air outlet of the ventilation tube 15 to help the shaft 7 to rotate.

The permanent magnets 11 and 45 formed in the center of the opposite side of the top of the inside support 5 and the bottom of the disk type plate 10 are disposed to face in the same polarities, thus surfacing the shaft 7 and the members 6 and 16 connected thereto. Further, the permanent magnets 11' and 45' formed in the girth elements of the opposite sides of the top of the support and the bottom of the disk type plate are disposed with inclination in the rotary direction of the shaft 7 and are formed in the same polarities so that they face each other and move relatively. The disk type plate 10 coupled to the shaft by means of the repulsion force continues to rotate and the members connected to the shaft 7 are also rotated by means of surfacing magnetic force and repulsive magnetic force.

Reference numeral 17 indicates a wind-swept place rib for protecting the charging plate 13 and preventing cooling of the charging plate 13 by means of wind force. Reference numeral 2 designates vehicle wheels driven by the driving motor 3 of the vehicle.

As such, the wind force vehicle having the wind force power system at its rear operates as follows.

First, the rotary shaft 7 and the members connected thereto are levitated by means of the repulsion force of the permanent magnets 11, 11', 45 and 45' located between the inside support 5 and the disk type plate 10, thus becoming a state with no load of the shaft. In this state, if the wind blows, the spherical ventilator 6 amplifies the wind. If the shaft 7 is rotated, the disk type plate type gear 8 beneath the shaft 7 is rotated to generate electricity through the electric generator 9. Such electricity is charged to the battery 1.

Furthermore, if the sun lights even if the wind does not blow, it is charged by the charging plate 13, which then generates electricity (though not shown in the drawings, a device for charging the sun's ray using the charging plate may be provided). Such electricity is charged to the charger 14 for driving the small-sized motor, whereby the small-sized motor 12 is driven to rotate the disk type rotary gear 8 closely adhered to the shaft of the small-sized motor 12. If the disk type rotary gear 8 is rotated, the electric generator 9 connected to the gear 8 generates electricity.

Furthermore, the disk type plate 10, the shaft 7 and the disk type rotary gear 8 are rotated by means of the repulsion force of the permanent magnets 11 and 11' which are disposed in the girth element of the opposite portions of the inside support 5 and the disk type plate 10 with inclination so that they can relatively move each other. Thus, the electric generator 9 connected thereto generates electricity.

In other words, the wind force vehicle having the rear provided with the wind force power system as described above can continually generate electricity although the wind blows with the vehicle parked or stopped or the wind does not blow. Such electricity can be consistently charged to the battery 1.

The electric power generated when the vehicle is parked or stopped will be enough if it can start the driving of the vehicle. After the vehicle drives, more greater electric power can be generated. If the vehicle starts to drive, the wind naturally moves from the high place of the vehicle to the low place of the vehicle and the spherical ventilator 6 can rotate more rapidly since it is floated by the permanent magnets 11, 11', 45 and 45' disposed between the inside support 5 and the disk type plate 10 that make the spherical ventilator 6 rotate. At the same time, the wind consistently moves through the ventilation tube 15 to hit the wind-swept place projection 16 located in the outlet, thus helping the rotary shaft 7 to rotate. As a result, the amount of electric power generated is greater than the amount of electric power consumed when the vehicle drives, so that the battery 1 is consistently charged with electricity.

Accordingly, the wind force vehicle as above can consistently generate electricity when the vehicle parked or stopped and charge the battery 1. Thus the vehicle can be driven without additional charging operation.

In the above, it is preferred that the power applied to the small-sized motor 19 is precluded when the vehicle drives and applied only the vehicle is parked or stopped.

SECOND EMBODIMENT

Figure 3:
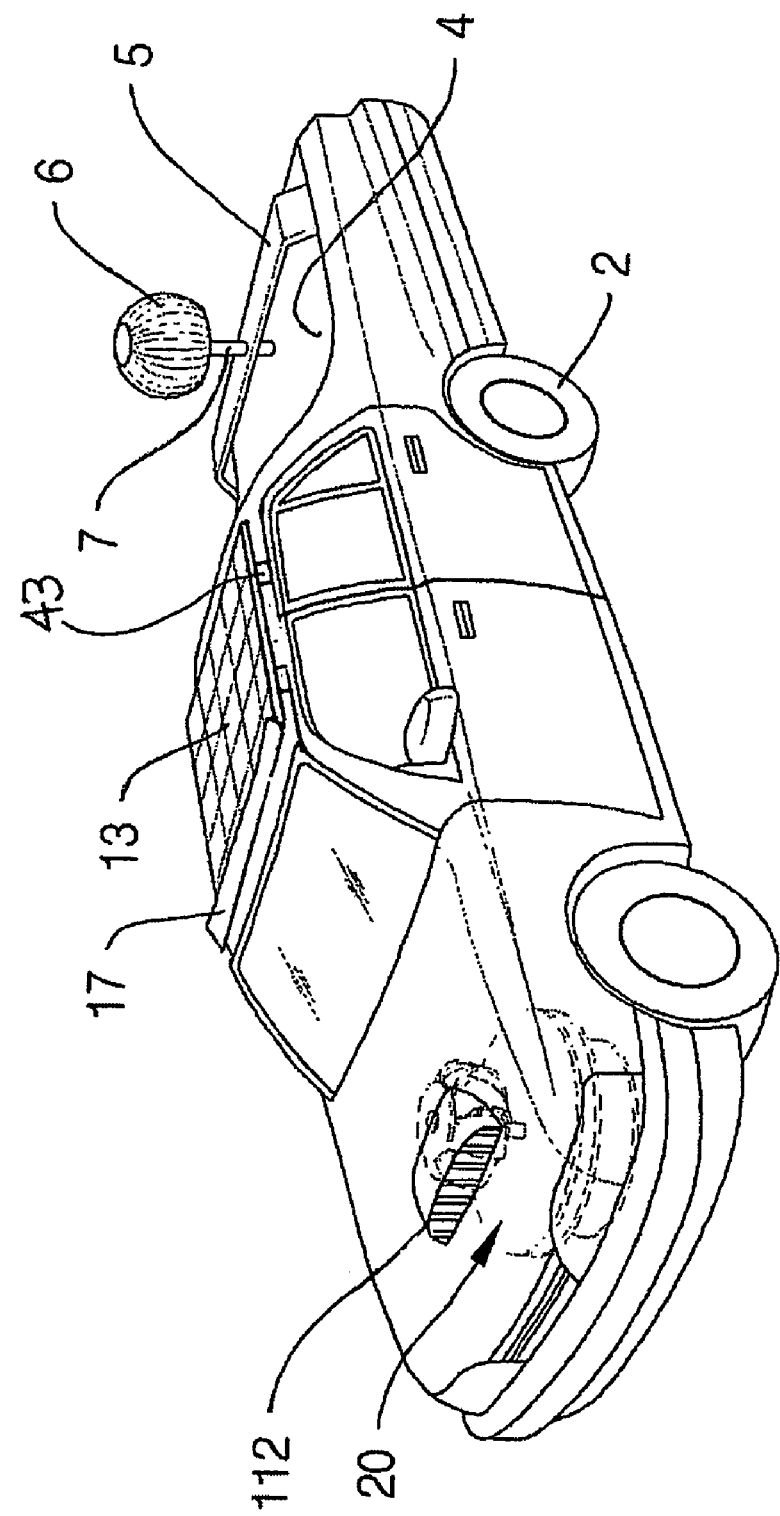
FIG. 3 is a perspective view illustrating the vehicle using wind force according to the present invention and an additional vehicle using wind force.
Figure 4:
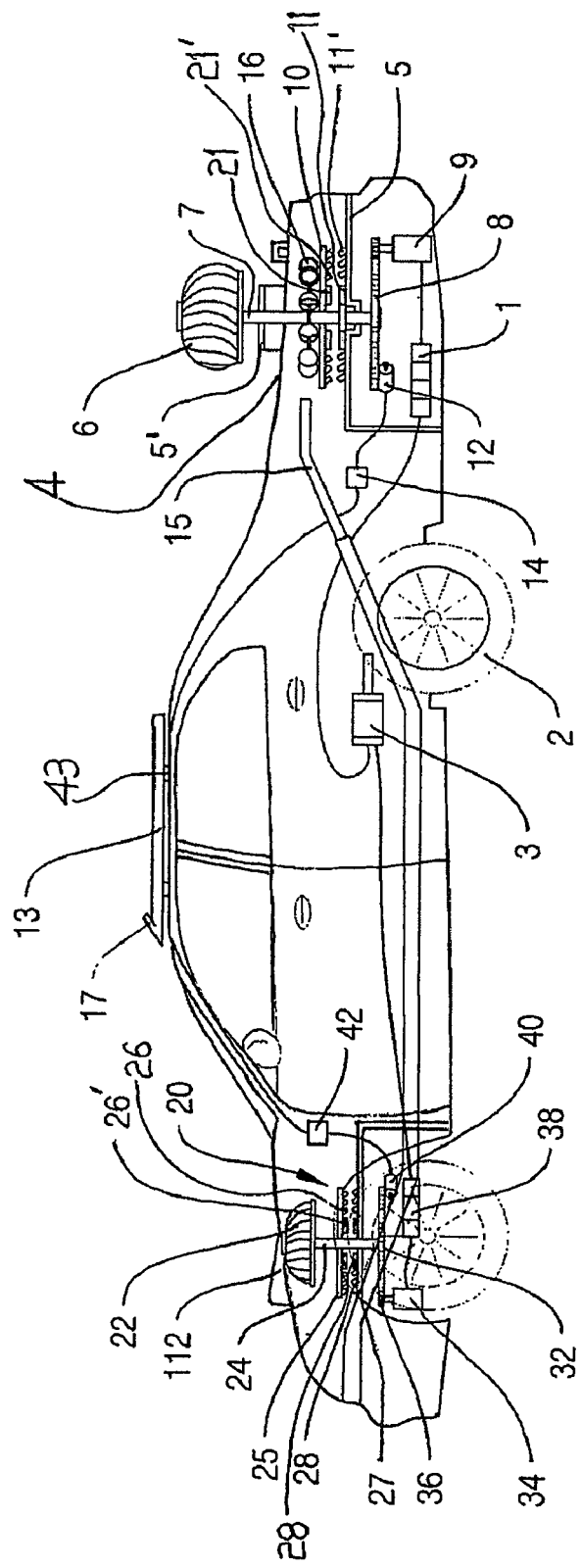
FIG. 4 is a perspective view illustrating the vehicle using wind force shown in FIG. 3 and an additional vehicle using wind force.

Meanwhile, in addition to the wind force power system formed in the truck lead 4 in the rear of the vehicle as described above, a wind force power system 20 is added to the hood panel at the front of the vehicle in order to double the generating power, as shown in FIG. 3 and FIG. 4.

In other words, an intercooler 112 is formed at the hood panel in the rear of the vehicle. The wind force power system 20 is formed within the intercooler 112, i.e., the hood panel.

The wind force power system 20 includes a ventilator 22 for rotating the air introduced through the intercooler 112 formed at the hood panel in the front of the vehicle, a rotary gear 32 connected to the ventilator 22 and the shaft 24, a follower gear 36 engaged with the rotary gear 32 to cooperatively operate with the gear 32, and an electric generator 34 connected to the follower gear 36.

Meanwhile, a disk type plate 25 cooperatively operated with the shaft 24 is disposed in the center of the shaft 24 for connecting the ventilator 22 and the rotary gear 32. Permanent magnets 26 and 26' are disposed at the bottom of the disk type plate 25. A support 27 in which permanent magnets 28 and 28' has the sane polarity facing the permanent magnet 26 and 26' is formed under the disk type plate 25.

Bearings are disposed between the support 27 and the shaft 24, helping the shaft 24 to rotate. The permanent magnet 26 and 26' of the disk type plate 25 are formed to face the same polarity as the permanent magnet 28 and 28' of the support 27. Thus, the disk type plate 25 has force that it tries to continuously rotate by means of repulsion force.

Meanwhile, the ventilator 22 has a common ventilator that can amplify introduced wind without addition power and can be strongly rotated in one direction.

Therefore, if the air (wind) is introduced through the intercooler 112 of the hood panel even when the vehicle is driving or stopped, the ventilator 22 of the ventilator type is rotated by the wind. This makes the ventilator 22 and the shaft 24 connected thereto rotating.

Accordingly, as the shaft 24 and the rotary gear 32 connected thereto start to rotate, the follower gear 36 engaged with the rotary gear 32 is rotated. Thus an electric generator 34 connected to the follower gear 36 generates electricity.

In the above, the disk type plate 25 in which the permanent magnets 26 and 26' are disposed at its bottom and the permanent magnet 28, 28' disposed in the support 27, which have the same polarity, are rotated by means of the maglev force due to the wind introduced through the intercooler 112, thus making the shaft 24 rotate more rapidly. The amount of electric power of the electric generator 34 is thus increased.

Meanwhile, a small-sized motor 40 for further increasing the rotary force of the rotary gear 32 is formed at one side of the rotary gear 32. The small-sized motor 40 is driven by solar heat.

In other words, a solar heat charging plate 13 supported by a support bar 36 is disposed at a predetermined location on the roof panel of the vehicle. The charging plate 13 is electrically connected to the charger 14. The charger 14 is also electrically connected to the small-sized motor 40.

Therefore, electric power charged through the solar heat charging plate 13 is stored in the charger 14. The electric power of the charger 14 helps the rotary gear 32 to rotate, while driving the small-sized motor 40.

As described above, the ventilator 22 is rotated by the wind. As the ventilator 22 and the disk type plate 25 are rotated, the rotary gear 32 is rotated. As the rotary gear 32 is rotated, the follower gear 36 is rotated to make the electric generator 34 generate electric power. The power generated from the electric generator 34 is charged to the battery 38.

Accordingly, the power of the battery 38 is transmitted to the driving motor 3 connected to the roof panel in the rear of the vehicle. The driving wheels 2 of the vehicle are driven by the rotation of the driving motor 3.

In other words, as the vehicle is self-charged continuously by means of wind, i.e., wind force while driving, the vehicle can continuously drive without additional charge.

Meanwhile, even if the vehicle does not drive or the wind does not blow, the disk type plate 25 is continuously rotated by means of the maglev force due to the repulsion force of the permanent magnet 26 of the disk type plate 25 and the permanent magnet 28 of the support 27. As the disk type plate 25 is rotated, the shaft 24 is rotated, and the rotary gear 32 and the follower gear 36 are also rotated. Thus, the electric generator 34 continuously generates electricity.

Furthermore, in the method described in the wind force power system provided in the trunk lead 4 in the rear of the vehicle, the permanent magnets 26' and 28' formed in the center of the opposite side of the top of the support 27 and the bottom of the disk type plate 25, thus making the shaft 24 and the members 22 connected thereto surfacing. The permanent magnets 28 and 26 formed in the girth element of each of the top of the support and the bottom of the disk type plate are formed with inclination in the rotary direction of the shaft 24 and are disposed in the same polarities so that they can relatively move each other. Thus, the disk type plate 25 coupled to the shaft by means of the repulsion force is continuously rotated. The members connected to the shaft 24 are rotated by the maglev force and the repulsive magnetic force.

Furthermore, the small-sized motor 40 continuously rotates the rotary gear 32 by means of the solar heat charging plate 13 disposed on the top of the roof panel of the vehicle. Thus, the electric generator 34 continues to generate electric power. The vehicle can be continuously supplied with the electric power even without additional charge.

In other words, the vehicle using wind force according to the present invention includes respective wind force isolated power systems each provided in the rear and front of the vehicle, thus obtaining more stronger electric power. It can be seen that the structures and operations of the wind force isolated power systems are the same or similar as described above.

Further, the trunk lead in the rear of the vehicle may have a known retractor type or various types so that it cannot be opened or opened or shut, if necessary.

INDUSTRIAL APPLICABILITY

According to the present invention described above, in addition to a wind force power system that is driven by the wind that flows along the roof panel when the vehicle drives to generate electricity, which is disposed in the trunk lead of the rear of the vehicle, an intercooler is formed in the hood panel and an additional wind force power system disposed within the hood panel, which is driven by the wind introduced through the intercooler to generate electricity, is added. Therefore, as electricity is continuously generated by means of the wind while the vehicle drives, there is an effect that the vehicle can be driven without additional charge.

Furthermore, the wind force power systems can generate electricity since they have the same polarity and can be rotated by means of maglev due to repulsion force. There is an effect that the vehicle can continue to generate electricity even when it is stopped.

In addition, a solar heat charging plate is disposed on the top of the roof panel of the vehicle. The wind force power systems are continuously driven by means of solar heat through a charging plate. There is an effect that the vehicle can continue to generate electricity even when it is stopped.

What is claimed is:

1. A vehicle using wind force having a wind force power system, wherein the vehicle includes a battery charged with electricity, and a driving motor electrically connected to the battery and connected to driving wheels, for transferring rotary force to the driving wheels, the wind force power system, comprising:
    a ventilator formed in a trunk lead in the rear of the vehicle, wherein the ventilator is rotated by the wind that flows along a roof panel;
    a shaft connected to the ventilator and fixed to a body of the vehicle, wherein the shaft is supported by a support in which permanent magnets are formed;
    a disk type rotary gear coupled to the bottom of the shaft;
    a disk type plate disposed opposite to the support on the shaft between the ventilator and the disk type rotary gear coupled to the shaft, wherein the disk type plate has the permanent magnets at the bottom in the same polarity as the permanent magnet formed in the opposite side of the support and is levitated by repulsion force;
    a follower gear engaged with the disk type rotary gear; and
    an electric generator for generating electricity as the follower gear rotates,
    wherein the electric generator of the wind force power system is electrically connected to the battery and the battery is electrically connected to the driving motor.

2. The vehicle using wind force claimed in claim 1, wherein the wind force power system is additionally disposed at a trunk panel in the rear of the vehicle, the wind force power system, comprising:
    an intercooler disposed in the hood panel in the front of the vehicle;
    a ventilator that is rotated by the wind introduced through the intercooler, wherein the ventilator is disposed within the hood panel;
    a shaft connected to the ventilator and fixed to the body of the vehicle, wherein the shaft is supported by a support in which permanent magnets are formed;
    a disk type rotary gear coupled to the bottom of the shaft;
    a disk type plate disposed opposite to the support on the shaft between the ventilator and the disk type rotary gear coupled to the shaft, wherein the disk type plate has the permanent magnets at the bottom in the same polarity as the permanent magnet formed in the opposite side of the support and is levitated by repulsion force;
    a follower gear engaged with the disk type rotary gear; and
    an electric generator for generating electricity as the follower gear rotates.

3. The vehicle using wind force claimed in claim 1, further comprising one or more ventilation tubes for ventilating the wind from the front of the vehicle to the rear of the vehicle, wherein the ventilation tubes are fixed to the body of the vehicle,
    wherein wind-swept place projections are formed on the disk type plate coupled to the shaft in equal distance in all directions,
    an outlet of each of the ventilation tubes is curved in the rotary direction of the shaft, whereby the outlet is oriented toward the wind-swept place projection and a disk type rotary gear fixed to the bottom of the shaft is made to rotate, increasing the amount of electric power of an electric generator.

4. The vehicle using wind force claimed in claim 1 or 2, wherein the permanent magnets are formed in the top girth element of the support that supports the shaft of the wind force power system, and the permanent magnets are formed in the bottom girth element of the disk type plate coupled to the shaft are disposed opposite to each other, and
    the permanent magnets and are disposed with inclination in the rotary direction of the shaft are disposed to face one another in the same polarities so that they can relatively move, whereby the members connected to the shaft have the rotary force by means of the repulsion force of the permanent magnets.

5. The vehicle using wind force claimed in claim 1 or 2, wherein the disk type rotary gear of the wind force power system is connected to a motor, wherein the motor is disposed on the top of the roof panel of the vehicle at a predetermined location at the top of the roof panel, and electrically connected to the charger charged with electricity through a solar heat charging plate supported by the support bar and driven by solar heat, whereby the motor helps the disk type rotary gear to rotate, increasing the amount of electric power of the electric generator.

* * * * *